April 3, 1945.  W. O. BENNETT, JR  2,372,757
TIMING DEVICE
Filed Dec. 19, 1941  3 Sheets-Sheet 1
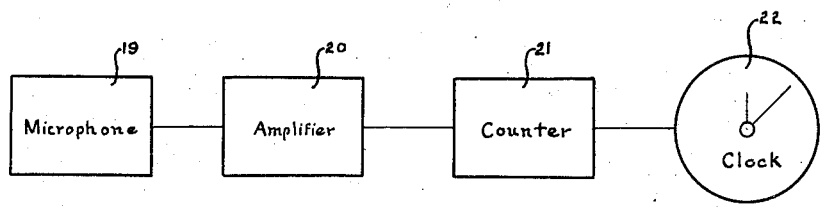
Fig. I
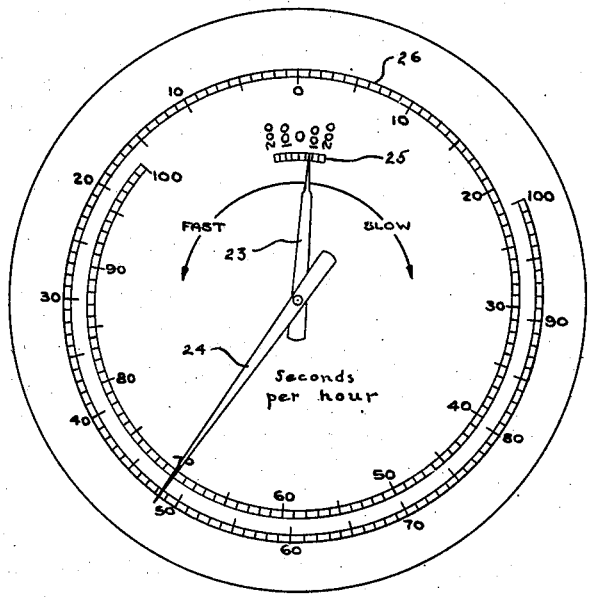
Fig. II
INVENTOR.
WILLIAM O. BENNETT JR
BY *James M. Heikman*
ATTORNEYS.

April 3, 1945.   W. O. BENNETT, JR   2,372,757
TIMING DEVICE
Filed Dec. 19, 1941   3 Sheets-Sheet 2
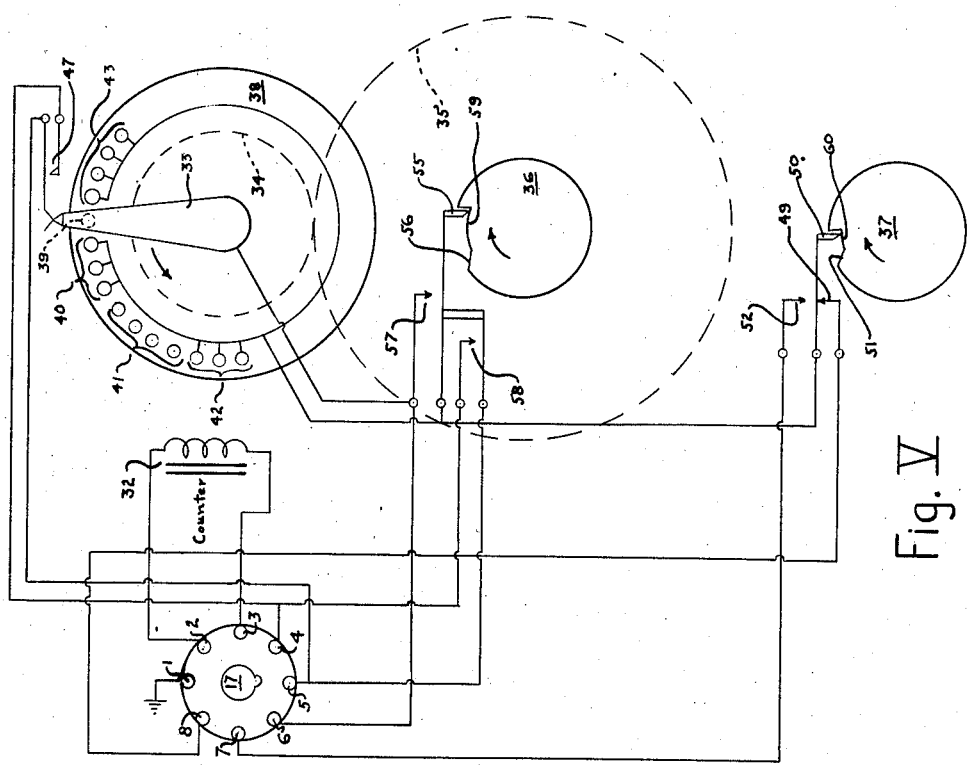
Fig. V
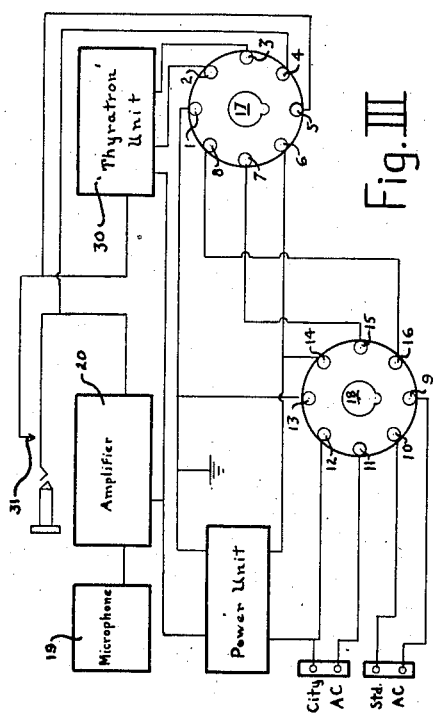
Fig. III
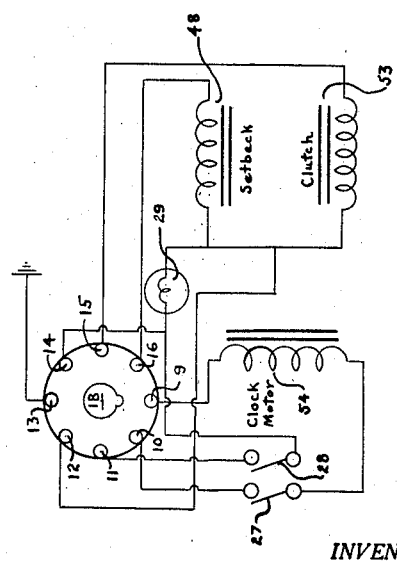
Fig. IV
INVENTOR.
WILLIAM O. BENNETT JR
BY James M. Kilman
ATTORNEYS.

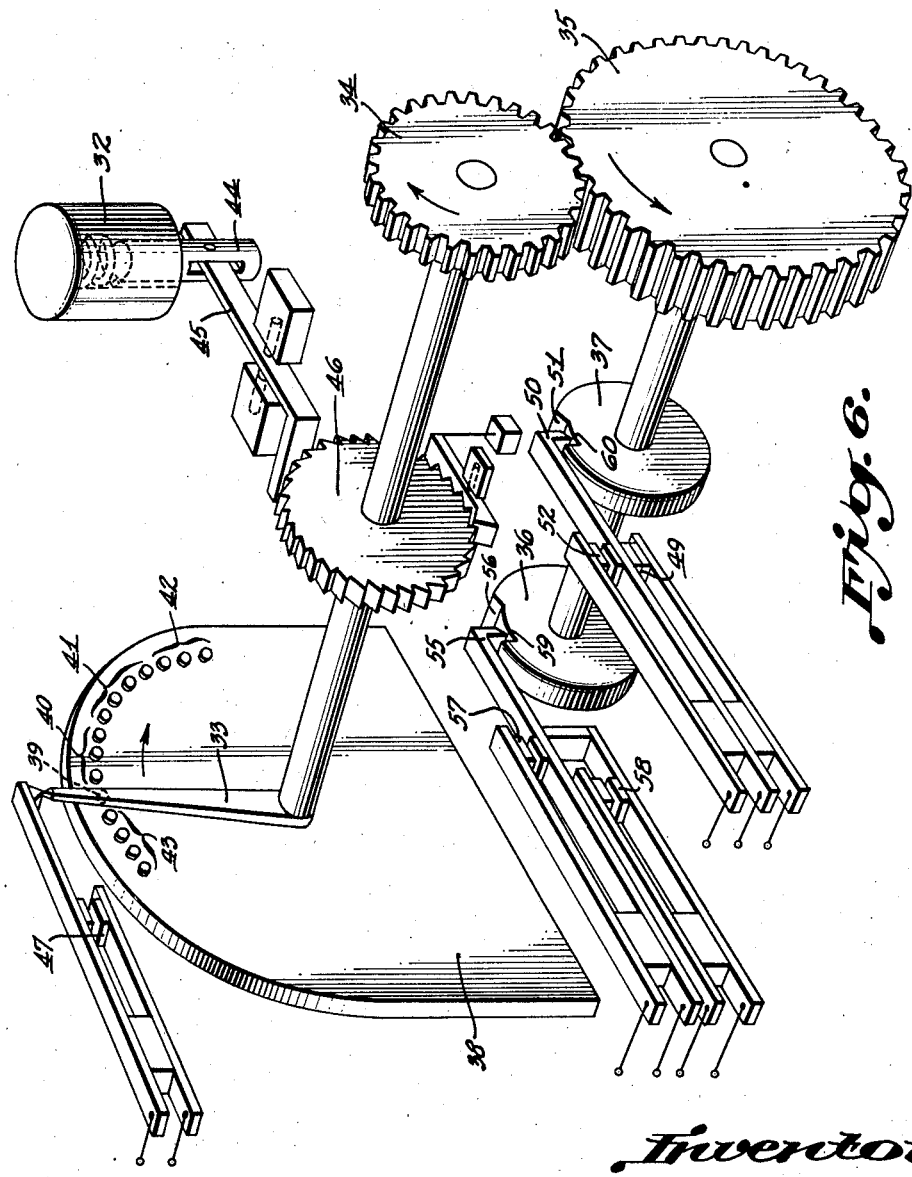

Patented Apr. 3, 1945

2,372,757

UNITED STATES PATENT OFFICE 2,372,757

TIMING DEVICE

William Ogle Bennett, Jr., Lancaster, Pa., assignor to Hamilton Watch Company, Lancaster, Pa.

Application December 19, 1941, Serial No. 423,609

10 Claims. (Cl. 73—6)

This invention relates to timing devices and has for its object the provision of means for measuring the time necessary for the accomplishment of a given series of periodically occurring phenomena.

Another object is to provide a device adapted to count off a given number of periodically occurring electrical impulses, and to measure the time required for the completion of that number of impulses.

Another object is to provide a device adapted to count off a given number of the periodically occurring sounds of a timepiece and to measure the time required for the completion of that number of sounds.

Other and further objects will be clearly apparent from the following specification and from the drawings.

Referring to the drawings:

Fig. I is a block diagram of the units of the invention;

Fig. II is an illustration of the face of the timing clock;

Fig. III is a schematic diagram of the microphone and amplifier arrangement;

Fig. IV is a schematic diagram of the counter unit;

Fig. V is a schematic diagram of the counter unit; and

Fig. VI is an illustrative perspective of the mechanical arrangement of the device of this invention.

Measurement of elapsed time in connection with a series of periodically occurring phenomena has considerable importance in checking the operation of various devices, or the frequency of an electric current or similar uses.

The device embodying this invention may be utilized to good advantage for testing timepieces by determining the time necessary to accomplish a given amount of operation of the timepiece under test.

One way of accomplishing this, and the method herein described as illustrative of this invention, is to operate a timing device during the occurrence of a given number of timepiece operating sounds, or ticks. This is done by automatically counting off a given number of ticks and automatically starting and stopping the operation of a timepiece such as a stop watch or clock, at the beginning and end respectively, of the tick counting period.

Thus an accurate picture may be obtained of the elapsed time required by a timepiece under test, to carry out a given amount of operation, as for example, the time necessary to accomplish 150 ticks of the timepiece under test.

The device of this invention is particularly useful in testing timepieces for relatively large errors in timekeeping, such as a check test of an initial assembly of a hairspring and balance wheel.

This invention is also particularly useful for testing watches of the position adjusted type in which the hairspring is formed to fit the watch primarily in accordance with dimension and contour considerations with the precision of the functional characteristics of the spring temporarily a secondary consideration.

The timing adjustment of such watches is ordinarily accomplished by using screws of different weights in the balance wheel or by adjusting the screws toward or away from the center of the balance wheel, or by adjusting the regulator arm.

Preferably the stop clock is calibrated to read in seconds deviation per hour of the watch under test, and thus provide such an indication as will aid in such adjustment of the balance wheel unit as will bring it within the range of the regulator and other available adjustments of the unit.

Briefly the operation of the device is as follows:

The tick sound of the watch is translated into an electrical impulse designed to trip a Thyratron type tube. The discharge of the Thyratron energizes a solenoid which operates a ratchet to move an arm from one contact to another, and this action is progressive over the number of contacts or ticks to be counted.

As the first contact to be counted is encountered, the stop clock is automatically started, and as the last contact is passed, the stop clock is automatically stopped.

Thus a given number of ticks may be counted off and the time necessary to complete the given series of ticks is designated by the stop clock.

Referring to Figs. III, IV and V, the common terminal plug 17 of Figs. III and V supports a terminal contact 1 which connects with ground, contacts 2 and 3, which tie in the "Thyratron" 30 output with the counter relay 32, contacts 4 and 5 which are in the circuit enabling switch 47 to take over the action of switch 31, and, in turn, switch 58 to take over the action of switch 47, and contacts 6, 7, and 8.

When switch 57 is closed by cam 36, contacts 6 and 7 are in the circuit through which the clutch solenoid 53 is energized. When switch 49 is closed, contacts 6 and 8 are in the circuit through which the setback solenoid 48 is energized.

The common terminal plug 18 of Figs. III and

IV supports a terminal contact 13 which connects with ground, a contact 14, common to the energizing circuits of both the setback coil 48 and the clutch coil 53, a contact 15 in the circuit of clutch 53, a contact 16 in the circuit of the setback 48, contacts 9 and 10 in the circuit of the clock motor 54, and contacts 11 and 12 in the city AC supply circuit for the setback 48 and clutch 53.

As illustrated in Fig. I, the device of this invention broadly comprises a microphone 19, adjacent or on which the watch to be tested is placed. The ticks of the watch provide the basis of electrical impulses representing the watch ticks, and these electrical impulses are impressed on and amplified by the amplifier unit 20.

The output of the amplifier 20 is impressed upon the counter unit 21 which comprises electro-mechanical means for counting the amplified electrical impulses and causing the clock 22 to register the elapsed time as the impulses are counted.

The motor of clock 22 is run continuously and, Fig. II, the hands 23 and 24 are automatically clutched into and out of operative arrangement in clockwise direction with the clock motor as governed by means in the counter 21 for counting a given number of watch ticks.

As shown in Fig. II, the small hand 23 is adapted to register large deviations on scale 25, and the large hand 24 is adapted to register on scale 26, between the calibrations of scale 25. The large hand 24 is adapted to be clutched in with the clock motor and small hand 23 is geared to large hand 24 with a high gear ratio.

On scales 25 and 26, with the hands 23 and 24 arranged to travel clockwise, clockwise from zero represents slow reading, that is for instance, the number of seconds per hour required in addition to 30 to accomplish 150 ticks of a watch which when keeping correct time completes 5 ticks per second, or 150 in 30 seconds.

Counterclockwise from zero on scales 25 and 26 represents fast reading, that is, for instance, the number of seconds per hour less than 30 required to accomplish 150 ticks of a watch as above.

As shown in Fig. II, the hands 23 and 24 register the rate of the watch under test as producing a loss of 70 seconds per hour. The clockwise portion of scale 26 is read in this case since the hand 23 registers on the clockwise or "slow" portion of scale 25. These hands 23 and 24 are geared in the ratio of 1 to 30 and while the big hand 24 is making approximately 30 revolutions (which is of course governed by the error) the small hand 23 is making one revolution, plus or minus a small fraction. This small fraction is always less than 100 seconds per hour which would always bring the hand 23 to register on the calibrated scale portion 25. A very small loss would, of course, prevent the hand 23 from completing a complete revolution which would register on the counter-clockwise portion of the scale 25 while a slight gain would cause the hand to register on the clockwise portion of said scale 25. The large hand 24 would, of course, be read in the light of the small hand's position.

The hands 23 and 24 travel in clockwise direction and at the start of the test normally register zero or other desired starting position on both scales, and if the watch under test is keeping correct time, they both stop on the zero of their respective scales 25 and 26 at the completion of the test.

Figs. III, IV, and V, taken together, diagrammatically illustrate the operation of the device of this invention with terminal plug 17 common to Figs. III and V, and terminal plug 18 common to Figs. III and IV.

Fig. III comprises blocks 19 and 20 of Fig. I, in greater detail, Fig. IV represents the clock 22 of Fig. I showing the electrical hookup, and Fig. V represents the counter unit 21 of Fig. I, showing the electrical hookup.

Considering Figs. III, IV, and V, the device is energized when switch 27, Fig. IV, is closed to start the clock motor and switch 28 is closed for general energization, including the lighting of a pilot light 29.

Following the illustrative example of the use of the device of this invention in testing timepieces, a watch is so placed as to have the sound of its ticks picked up by the microphone 19 and impressed on the amplifier 20 as electrical impulses.

The output of amplifier 20 is adapted to be impressed on the "Thyratron" unit 30, but only when switch 31 is closed, as is done manually when it is desired to operate the counter unit of Fig. V. The "Thyratron" 30 is incorporated in amplifier unit 20 of Fig. I, and separated therefrom in Fig. III, for purposes of ready explanation.

With switch 31 closed, each tick of the watch under test fathers an electrical impulse which trips the "Thyratron" unit 30, the output of which, in turn, periodically and in correspondence with the watch ticks, energizes the counter relay 32.

Each energization of the counter relay 32 causes the counter or stepper arm 33 to make one step along a circular path of travel. In the illustration of Fig. V, the direction of this path of travel is designed to be counterclockwise about the pivoted lower end of the stepper arm 33.

As the arm 33 turns, it causes stepper gear 34 to rotate in the same counterclockwise direction, and as stepper gear 34 turns it causes cam gear 35 to rotate in a clockwise direction, and consequently also causes cams 36 and 37, which are driven by cam gear 35, to rotate in a clockwise direction.

A contact plate or disc 38 is provided, and has contact points thereon with which the arm 33 engages as it turns. The contact points are arranged in groups, with the exception of contact 39 which is a dead contact with which the arm 33 engages when in ready to start position as shown.

Group 40 consists of three live setback contacts. Group 41 consists of four dead cam contacts, group 42 consists of three live clutch contacts, and group 43 consists of four live finishing contacts.

For purposes of ready illustration, the arm 33 is shown as adapted to move in different directions in Figs. V and VI, and the contacts of plate 38 are arranged accordingly.

The action of the mechanical portion of the device is illustrated in Fig. VI. As the counter solenoid 32 is energized by a watch tick impulse, plunger 44 is so moved as to pivot the ratchet arm 45 and cause the ratchet wheel 46 to be moved one step of rotation.

This stepping action of the ratchet wheel 46 causes the arm 33 to rotate one step and to break with one contact and engage with another. The arrangement of arm 33 and the contacts is preferably such that the arm 33, as it travels from one contact to the next, engages the next contact before it breaks with the previously engaged contact, so that the electrical circuit is unbroken during the movement of the arm 33 from one live contact to another.

The arm 33 when in ready to start position as shown in the drawings, contacts and holds open the holding switch 47, which, when closed, takes over from the momentarily acting starting switch 31, the function of closing the circuit between the amplifier 20 and the "Thyratron" 30.

When it is desired to start the test, the starting switch 31 is manually momentarily closed and the output of the amplifier 20 is consequently impressed on the "Thyratron" 30. The first energization of the counter coil 32 thus produced, causes the arm 33 to so move as to engage the nearest contact of the group 40 setback contacts.

As the arm 33 is so moved, holding switch 47 is closed, thus ensuring the continuance of the connection between amplifier 20 and "Thyratron" 30. As the arm 33 engages one of the contacts of group 40 the setback solenoid 48 is energized, causing the hands 23 and 24, Fig. II, of the timing clock to return to zero or other arranged starting position, preparatory to carrying out a timing period. This setback coil energization is possible since switch 49 of cam 37 is closed.

As the continued periodic energization of counter coil 32 continues, the arm 33 progresses past contact group 40 and engages the dead cam contacts of group 41. As soon as the arm 33 is completely past the contacts of group 40, the setback circuit is broken and the coil 48 deenergized.

During the progress of arm 33 over contact group 41, the cam 37 so progresses in its rotation as to cause the cam finger 50 to ride up the surface 51 and break the setback switch 49 and close the clutch switch 52.

As the arm 33 continues to progress, it engages the first of the clutch contacts of group 42. This engagement, since switch 52 is closed, energizes the clutch solenoid 53, thus operatively connecting the clock hands 23 and 24 with the clock motor 54, and beginning the actual timing of a series of watch ticks.

While the arm 33 is passing the contacts of group 42 the cam 36 so progresses in its rotation as to cause the cam finger 55 to ride up the surface 56 and close switch 57 to maintain the energization of the clutch solenoid 53 after the arm 33 has passed the clutch contact group 42, as well as closing switch 58 to maintain the circuit between the amplifier 20 and "Thyratron" 30 even though the arm 33 in rotating more than once, opens the switch 47 as it goes by. This since, for convenience in the course of a test, the proportional relation of the travel of the cams 36 and 37 to the arm 33 is 1 to 4, although it may be any other convenient proportion if desired.

As the arm 33 continues its travel and passes the clutch contact group 42, the setback is cut out by switch 49 being open, the clutch is kept energized by switch 52 being closed, the watch tick impulses keep coming because switch 57 is closed although arm 33 now engages no contact, and arm 33 is enabled to pass dead contacts and to open switch 47 with no effect because the holding switch 58 is closed.

In this condition the device continues its operation with each tick of the watch causing the arm 33 to advance a step, until the arm has, in this instance, completed three revolutions, and approaches the completion of its fourth. At this point, both cams 36 and 37 are approaching the completion of their one revolution, with cam 36, by reason of the extent and position of its cutaway portion, adapted to cause its cam finger 55 to drop before that of cam 37.

After the arm 33 engages, on its fourth revolution, the first of the contacts of finishing group 43, cam finger 55 drops into recess 59 of cam 36 with the consequent opening of switches 57 and 58. Consequently as the arm 33 passes from engagement with the live contact group 43 to the dead contact 39, the clutch solenoid 53 is deenergized and the clock hands 23 and 24 are stopped so that their position on the dial of Fig. II indicates the result of the test.

Also the opening of switch 47 by the arm 33 breaks the circuit between the amplifier 20 and "Thyratron" 30 so that the continuing ticks of the watch under test no longer cause the counter relay 32 to be periodically energized and the arm 33 therefore remains on the dead contact 39 until another test is started by again closing the starting switch 31.

The action of the cam 37 is such that the cam finger 50 drops into the cam recess 60 just as the arm 33 moves from engagement with live contact group 43 to dead contact 39. Consequently, the energizing circuit for the clutch solenoid 53 remains closed as long as arm 33 engages one of the live contacts of group 43.

As the arm 33 moves to engagement with the dead contact 39 clutch switch 52 is opened and setback switch 49 closed in consequence of the cam finger 50 dropping into the cam recess 60.

With this arrangement, the device is ready to start another test.

It is to be understood that variation in the numbers and spacings of the contact groups of plate 38 may readily be made as well as differences in the cam arrangements or other arbitrarily variable features without departing from the spirit of this invention. The details given are merely illustrative.

What I claim is:

1. In a device of the character described, means adapted to automatically count off a given number of periodically occurring electrical impulses, including a mechanical stepper arm, a series of electrical contacts associated therewith, and means so operable upon the occurrence of each of said impulses as to move said arm from one of said contacts to another, a timing device and means so operable upon the engagement of said arm with one of said contacts as to start and maintain said timing device in running condition and means operable upon engagement with another of said contacts as to stop said timing device.

2. In a device for use with means for producing periodically occurring sounds, means adapted to produce an electrical impulse from each of a given series of said sounds, means adapted to count off said electrical impulses including a mechanical stepper arm, a series of electrical contacts associated therewith, and means so operable upon the occurrence of each of said impulses as to move said arm from one of said contacts to another, a timing device and means so operable upon the engagement of said arm with one of said contacts as to start and maintain said timing device in running condition and means operable upon engagement with another of said contacts as to stop said timing device.

3. In a device of the character described, a timing device, means adapted to automatically count off a given number of periodically occurring electrical impulses, said means including a mechanical stepper arm, a series of electrical contacts associated with said mechanical stepper to control said timing device and means so operable upon the occurrence of each of said impulses as to move said arm from one of said contacts to another, and means so operable upon the engagement of said arm with one of said contacts as to set back an indicator of said timing device to a starting position, so with another of said contacts as to start said timing device, and so with still another as to stop said timing device.

4. In a device for use with means for producing periodically occurring sounds, a timing device, means adapted to produce an electrical impulse from each of a given series of said sounds, means adapted to count off said electrical impulses including a mechanical stepper arm, a series of electrical contacts associated with said stepper arm and controlling the operation of said timing device, and means so operable upon the occurrence of each of said impulses as to move said arm from one of said contacts to another, and means so operable upon the engagement of said arm with one of said contacts as to set back an indicator of said timing device to a starting position, so with another of said contacts as to start said timing device, and so with still another as to stop said timing device.

5. In a device of the character described, a microphone unit for picking up the "tick" sounds of a timepiece, means for amplifying the output of said microphone, a counter unit comprising a solenoid adapted to be periodically energized by the output of said amplifying means, a lever adapted to be moved about a pivot as the result of each energization of said solenoid, a ratchet wheel adapted to be moved one step in rotation for each of said lever movements, a shaft secured to said ratchet wheel and rotatable therewith, a contact arm secured to said shaft and a series of electrical contacts in association with said contact arm which is adapted to be moved from one contact to another as the result of each step of said ratchet wheel, and means so operable upon the engagement of said arm with one of said contacts as to start a timing device, and so with another of said contacts as to stop said timing device.

6. In a device of the character described, a microphone unit for picking up the "tick" sounds of a timepiece, means for amplifying the output of said microphone comprising a standard amplifier and a "Thyratron" unit, a counter unit comprising a counter solenoid adapted to be periodically energized by the output of said amplifying means, a lever adapted to be moved about a pivot as the result of each energization of said counter solenoid, a ratchet wheel adapted to be moved one step in rotation for each of said lever movements, a contact arm rotatable with said ratchet wheel and a series of electrical contacts in association with said contact arm which is adapted to be moved from one contact to another as the result of each step of said ratchet wheel, and a timing device comprising a clutch solenoid adapted to be energized upon the engagement of said arm with one of said contacts, and to be deenergized upon the engagement of said arm with another of said contacts, a timing clock motor and a pair of clock hands adapted to be operatively connected as the result of said energization of said clutch solenoid and to be disconnected as the result of said deenergization of said clutch solenoid.

7. A timing device comprising means for changing the ticks of a watch to periodic electrical impulses, a counter mechanism actuated by said electrical impulses, a timing device, a series of contacts controlling the operation of said timing device, a contact arm adapted to selectively and in order engage said contacts and mechanical connection between said counter mechanism and said contact arm to control the movement of said arm.

8. A timing device comprising means for changing the ticks of a watch to periodic electrical impulses, a counter mechanism actuated by said electrical impulses, a timing device, a series of contacts controlling the action of said timing device, a contact arm adapted to selectively and in order engage said contacts and a step by step mechanical movement translating motion of the counter mechanism to said contact arm.

9. A timing device comprising means for changing the ticks of a watch to periodic electrical impulses, means for transforming said electrical impulses into step by step mechanical movement, a contact arm moving in accordance with said step by step movement, a series of contacts adapted to be successively engaged by said contact arm and a timing device controlled by said contacts to measure the duration of a predetermined number of ticks.

10. A timing device comprising means for changing the ticks of a watch to periodic electrical impulses, a magnet actuated by said impulses, a ratchet arm moved by said magnet, a ratchet wheel advanced step by step by said arm, a shaft on said wheel, a contact arm on said shaft and turning therewith, a series of contacts adapted to be successively engaged by said arm and a timing device controlled by said contacts to measure the duration of a predetermined number of watch ticks.

WILLIAM OGLE BENNETT, Jr.